J. A. McPHAYDEN & C. T. DE VEAUX.
METHOD OF MAKING RADIATORS AND ANALOGOUS TUBULAR STRUCTURES.
APPLICATION FILED MAY 12, 1911.
1,014,603.
Patented Jan. 9, 1912.
2 SHEETS—SHEET 1.
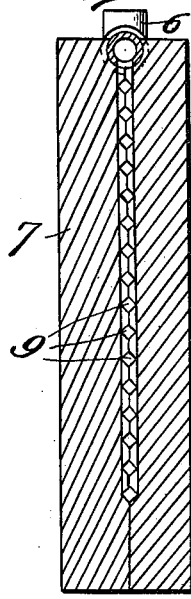
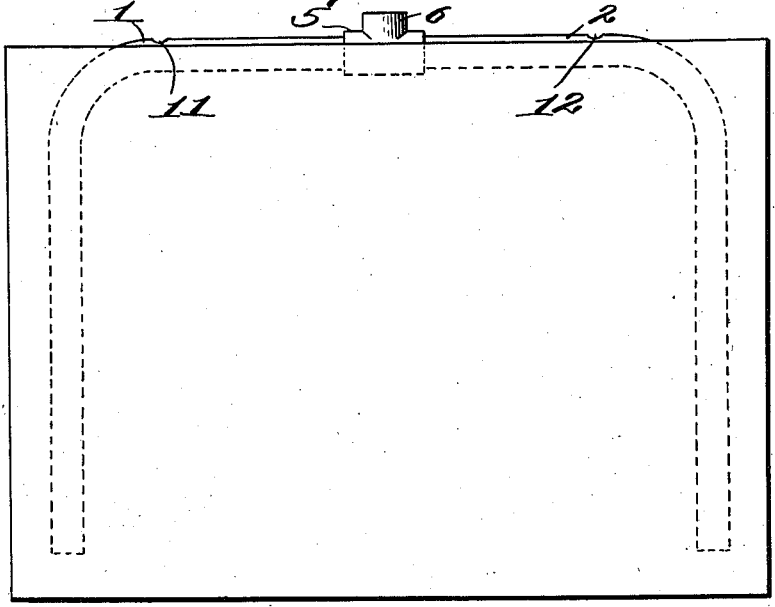
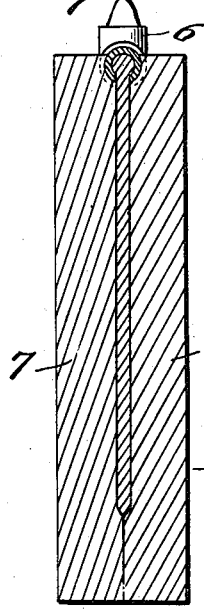
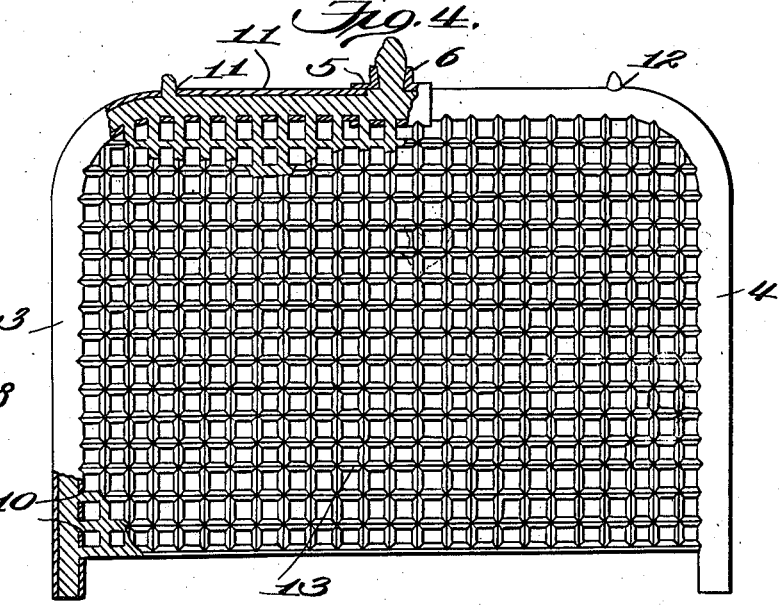
Witnesses:
Inventors
John A. McPhayden
Charles T. De Veaux J. A. McPHAYDEN & C. T. DE VEAUX.
METHOD OF MAKING RADIATORS AND ANALOGOUS TUBULAR STRUCTURES.
APPLICATION FILED MAY 12, 1911.
1,014,603.
Patented Jan. 9, 1912.
2 SHEETS—SHEET 2.
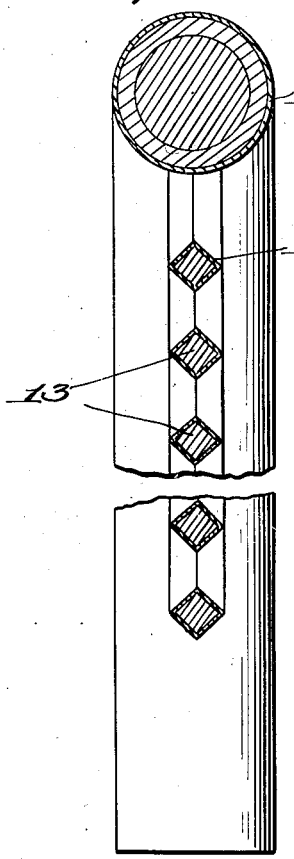
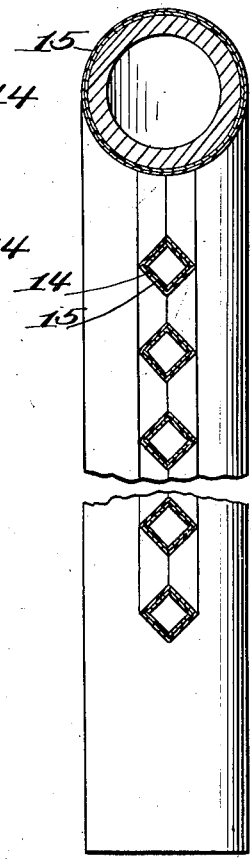
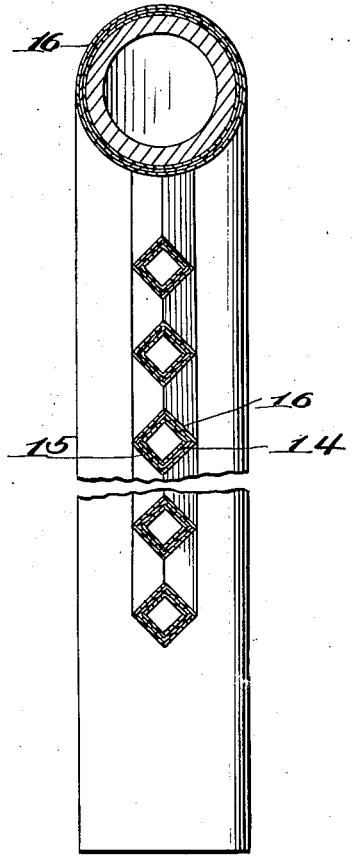
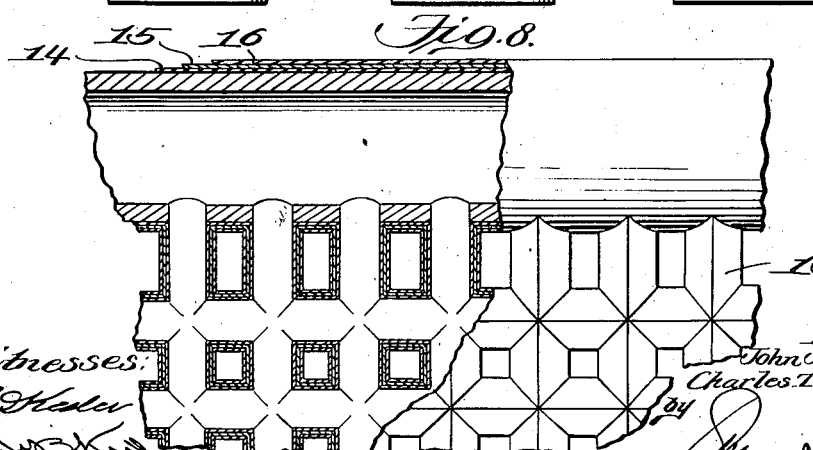

UNITED STATES PATENT OFFICE.

JOHN A. McPHAYDEN AND CHARLES T. DE VEAUX, OF CHATTANOOGA, TENNESSEE.

METHOD OF MAKING RADIATORS AND ANALOGOUS TUBULAR STRUCTURES.

1,014,603. Specification of Letters Patent. Patented Jan. 9, 1912.

Application filed May 12, 1911. Serial No. 626,820.

*To all whom it may concern:*

Be it known that we, JOHN A. McPHAYDEN and CHARLES T. DE VEAUX, citizens of the United States, residing at Chattanooga, in the county of Hamilton and State of Tennessee, have invented new and useful Improvements in Methods of Making Radiators and Analogous Tubular Structures, of which the following is a specification.

The present invention relates to improvements in the art of making radiators and analogous tubular structures, and the primary object of the invention is to provide a novel method whereby radiators may be made inexpensively and the hollow tubular body thereof will be composed of an integral seamless structure of great strength, the expense and other objections incident to the soldering, brazing or other modes of joining component parts as usually practiced in the building of structures of this character being avoided, the seamless construction renders the radiator free from leakage even though it may be subjected to vibration and other strains, and, furthermore, the present invention insures the production of a structure of this character which is reinforced in such a manner that it is well protected from damage or injury.

More particularly, the invention provides a novel method of manufacturing radiators as used upon automobiles whereby the grid or network of relatively small tubes is formed as an integral seamless structure, and this grid or network of tubes has a marginal reinforcement preferably in the form of an iron, steel, or other strong metal tube which serves for the support of the inclosed grid or network and prevents injury thereto, the tubular grid or network being connected to and communicating with the outer reinforcement or tubing without the necessity of using joints or other connections which in the ordinary forms of automobile radiators are subject to leakage due to vibration of the car or injury.

In the accompanying drawing, we have shown certain apparatus by the aid of which the method may be performed, and we have also shown diagrammatically different steps of the method.

Figure 1 represents a vertical transverse section through a split or divided mold by the aid of which a core is cast which serves as a matrix upon which the tubular structure is formed, the outer reinforcing frame being shown within the mold; Fig. 2 represents a side elevation of the mold with the reinforcing frame therein and in readiness for the cast; Fig. 3 is a section of the mold similar to Fig. 1 and showing the metal cast therein; Fig. 4 represents a face view of the reinforcing frame and the cast core; Fig. 5 represents an enlarged section of a portion of the radiator after a layer of metal has been deposited on the core and the surrounding reinforcing frame; Fig. 6 is a view similar to Fig. 5 showing the core removed and a second layer of metal deposited upon the structure; Fig. 7 shows in section a third layer or covering of metal deposited thereon; and Fig. 8 is a detail view partly in section of a portion of a radiator made in accordance with the present invention.

Similar parts are designated by the same reference characters in the several views.

In the accompanying drawing, we have shown our method as applied to the manufacture of radiators of the type used upon automobiles, as the invention provides for the manufacture of radiators of this type at relatively small expense, and the radiators so made are capable of withstanding the severe service to which radiators of this type are subjected. It will be understood, however, that the invention is applicable to the manufacture of radiators or analogous tubular structures for other purposes.

In manufacturing an automobile radiator in accordance with the present invention, it is preferable to use a hollow reinforcing frame which is adapted to serve as a support for the relatively small tubing and as a protecting medium therefor. In the present instance, we have shown two pipe sections 1 and 2 which may be composed of iron, steel or other relatively strong material having the upright legs 3 and 4 the lower ends of which may be connected to a reservoir and the upper horizontal ends may be connected to a suitable fitting 5 which has a nipple 6 whereby a section of the radiator may be connected to a suitable cap. This hollow reinforcing frame is placed in a mold which is preferably split or composed of two sections 7 and 8, the complemental faces of the mold sections being suitably grooved to accommodate the frame although the upper part of the frame as well as the nipple 6 of the fitting is preferably exposed at the top of the mold, as shown in Figs. 1 and 2. The complemental faces of the mold sections are also grooved or otherwise formed to provide passages 9 which correspond in arrangement or design to that of the tubular grid of the radiator to be made. The inner side of the hollow reinforcing frame is bored or otherwise formed with apertures 10 which correspond to and are in alinement with the passages 9 in the mold, and to facilitate the entrance of the metal into the mold, the hollow frame may also be provided with openings 11 and 12.

After the hollow reinforcing frame has been placed in the mold and the sections thereof have been bolted or otherwise locked together, the mold with the frame therein is immersed in a bath containing molten metal. Metals of different kinds may be used, although a metal having a low fusing point is preferable. It has been found that an alloy composed of equal parts of tin and lead is suitable for the purpose. When the mold has been submerged in the bath of molten metal, this metal will enter the mold through the nipple 6 of the fitting 5 and the supplemental openings 11 and 12, the metal filling the horizontal reinforcing frame and also flowing out through the apertures 10 therein and entering the passages 9 in the mold, thereby forming a solid soft metal grid 13 the margins of which join and are supported by the marginal reinforcing frame.

The reinforcing frame with the cast grid or core supported thereby is then subjected to an electro-plating operation. This operation may be performed by suspending the frame with the cast metal core or grid therein in an electro-plating bath. Preferably copper is deposited electrolytically upon the grid serving as a core and upon the marginal reinforcing frame, and to this end, the usual electro-plating solution of copper sulfate may be used. The electro-plating operation is continued until a sufficient thickness of copper has been electrolytically deposited upon the soft metal grid serving as a core and upon the marginal reinforcing frame. The structure may then be removed from the electro-plating bath and dipped into a flux and after the flux has been applied, the structure is immersed again in a bath of molten metal, preferably of tin and lead, the immersion of the structure in this latter bath accomplishing the double purpose of melting the soft metal core from the grid and the marginal reinforcing frame, and a coating or layer of the metal composing the bath will be deposited upon the entire exterior surface of the structure. Fig. 6 represents the structure after this latter operation has been performed, the grid being now tubular and composed of an inner layer 14 of copper and an outer layer 15 of soft metal. The structure is then preferably subjected to a second electro-plating operation whereby a third coating or layer 16 of copper is deposited upon the entire exterior or exposed surface of the structure, and this second electro-plating operation may be continued until the tubular or hollow grid structure is of the desired thickness and strength. By applying the intermediate or second layer 15 of soft metal, all minute irregularities in the surface of the first electrolytically deposited layer 14 will be eliminated and the second electrolytically deposited layer or coating 16 will be uniform and even. The final coating of metal upon the structure may be polished or otherwise finished as may be desired.

It is to be understood that the different layers or coatings of metal which compose the tubular body of the radiator are also deposited upon the exterior surface of the marginal reinforcing frame, and this not only insures a firm support for the tubular body, but the integral nature of the structure renders the same seamless, thereby avoiding any possibility of leakage. Moreover, the method of depositing the metal in the formation of the structure insures uniform thickness and strength for the walls thereof. Moreover, by depositing the first layer of copper electrolytically upon a metal core, the metal so deposited is homogeneous, firm, and in the form of a sheet, and by applying the coating of tin or soft metal to the elctro-deposited layer, any pores or irregularities in the surface thereof will be filled, strength and rigidity is imparted to the walls of the tubular structure, and by smoothing the tin or soft metal coating by the use of a wire brush or other suitable implement, a smooth continuous metallic surface is offered for the elctrolytic deposition of the third layer of metal, and this latter layer will present a smooth even surface.

Radiators and similar tubular structures constructed in accordance with the present invention will be seamless and free from joints, thereby minimizing liability to leakage, and they also possess great strength and are protected in such manner as to effectually avoid injury.

We claim as our invention:—

1. A method of making structures of the class described which comprises forming a grid-like core within a marginal frame, depositing metal on said core and frame to completely cover both, and removing the core.

2. A method of making radiators and similar tubular structures which comprises forming and supporting a complete metallic grid-like core in a reinforcing frame, depositing metal on said core and frame to completely cover both, and removing the core.

3. A method of making structures of the class described which comprises forming a solid soft metal grid-like core within a marginal hard metal frame, electrolytically depositing metal on said core and frame, and removing the core from the interior of the deposited metal.

4. A method of making structures of the class described which comprises molding a metal core within a marginal frame, electrolytically depositing metal on said core and frame, and heating the structure to remove the metal core therefrom.

5. A method of making structures of the class described which comprises molding a soft metal core in a hollow marginal frame, electrolytically depositing metal on the core and frame, and heating the structure to melt and remove the metal core from the interior of the deposited metal and the hollow frame.

6. A method of making structures of the class described which comprises molding a soft metal core, electrolytically depositing a layer of metal on the core, and immersing the structure in a molten bath of soft metal to apply a coating of such soft metal to the electrolytically deposited layer and to melt and remove the core from the interior thereof.

7. A method of making structures of the class described which comprises forming a soft metal core, electrolytically depositing a layer of metal on the exterior thereof, immersing the structure in a molten bath of soft metal to apply a coating of soft metal to the surface of the elctrolytically deposited layer of metal and to melt and remove the soft metal core from the interior thereof, and elctrolytically depositing a layer of metal on the soft metal coating.

8. A method of making structures of the class described which comprises forming a core of soft metal, electrolytically depositing a layer of metal thereon, applying a flux to said layer of metal, immersing the structure in a molten bath of soft metal to apply a coating of soft metal to said layer of metal and to melt and remove the core. and electrolytically depositing a layer of metal on the coating of soft metal.

9. A method of making structures of the class described which comprises placing a hollow reinforcing frame in a sectional mold, casting a grid of soft metal in the mold, electrolytically depositing a layer of metal upon the exterior of the grid and frame, applying a flux to said layer of metal, immersing the structure in a molten bath of soft metal to apply a coating of soft metal to said layer and to melt and remove the core from the interior thereof, and electrolytically depositing an additional layer of metal on the coating of soft metal.

10. A method of making radiators and analogous structures which comprises forming a grid-like core, electrolytically depositing a layer of metal on the core, applying a coating of relatively soft metal to said layer to close the pores and irregularities thereof, and electrolytically depositing a layer of metal on said coating of soft metal, the core being removed to make the grid-like structure thus produced hollow.

In testimony whereof we have hereunto set our hands in presence of two subscribing witnesses.

JOHN A. McPHAYDEN.
CHARLES T. DE VEAUX.

Witnesses:
CHAS. CATT,
S. H. CAMPBELL.